United States Patent
Nishiyama et al.

(10) Patent No.: US 10,200,184 B2
(45) Date of Patent: Feb. 5, 2019

(54) COMMUNICATION APPARATUS, COMMUNICATION SYSTEM AND COMMUNICATION METHOD

(71) Applicant: Sony Corporation, Tokyo (JP)

(72) Inventors: Fumihiro Nishiyama, Saitama (JP); Katsumi Watanabe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 156 days.

(21) Appl. No.: 14/916,666

(22) PCT Filed: Jul. 24, 2014

(86) PCT No.: PCT/JP2014/069618
§ 371 (c)(1),
(2) Date: Mar. 4, 2016

(87) PCT Pub. No.: WO2015/037341
PCT Pub. Date: Mar. 19, 2015

(65) Prior Publication Data
US 2016/0197716 A1    Jul. 7, 2016

(30) Foreign Application Priority Data
Sep. 10, 2013   (JP) ................................. 2013-187066

(51) Int. Cl.
*H04L 5/16*  (2006.01)
*H04L 5/18*  (2006.01)

(52) U.S. Cl.
CPC . *H04L 5/16* (2013.01); *H04L 5/18* (2013.01)

(58) Field of Classification Search
None
See application file for complete search history.

(56) References Cited

U.S. PATENT DOCUMENTS

| | | | |
|---|---|---|---|
| 2010/0048126 A1* | 2/2010 | Nishiyama | H04W 76/048 455/41.1 |
| 2010/0128132 A1* | 5/2010 | Fukushima | H04N 1/00278 348/207.2 |

(Continued)

FOREIGN PATENT DOCUMENTS

| JP | 2010-124388 A | 6/2010 |
|---|---|---|
| JP | 4840043 B | 12/2011 |

(Continued)

OTHER PUBLICATIONS

Tomoya Tandai et al: "MAC Efficiency Enhancement with Prioritized Access Opportunity Exchange Protocol for 60 GHz Short-Range One-to-One Communications", Vehicular Technology Conference (VTC Spring), 2011 IEEE 73rd, IEEE, May 15, 2011 (May 15, 2011), pp. 1-5, XP031896869, DOI: 10.1109/VETECS.2011. 5956469 ISBN: 978-1-4244-8332-7.*

*Primary Examiner* — Jamal Javaid
*Assistant Examiner* — Rosene Clark
(74) *Attorney, Agent, or Firm* — Chip Law Group

(57) ABSTRACT

Provided is a communication apparatus including: a switch unit configured to switch data communication to be performed with another communication apparatus on a transmission side or a reception side; and a communication unit configured to transmit transmission data to the other communication apparatus and receive a response when the data communication is performed on the transmission side, and receive reception data from the other communication apparatus and transmit a response when the data communication is performed on the reception side. The switch unit performs switching from the transmission side to the reception side when the response received by the communication unit includes a switching instruction.

9 Claims, 11 Drawing Sheets

(56) References Cited

U.S. PATENT DOCUMENTS

| | | | |
|---|---|---|---|
| 2010/0297939 A1* | 11/2010 | Fujita | H04W 4/00 455/41.1 |
| 2011/0103224 A1* | 5/2011 | Nishioka | H04L 5/14 370/235 |
| 2011/0182216 A1* | 7/2011 | Ono | H04L 5/16 370/282 |

FOREIGN PATENT DOCUMENTS

| | | |
|---|---|---|
| JP | 2013-062742 A | 4/2013 |
| WO | 2003/026215 A | 3/2003 |

* cited by examiner

COMMUNICATION APPARATUS, COMMUNICATION SYSTEM AND COMMUNICATION METHOD

TECHNICAL FIELD

The present disclosure relates to a communication apparatus, a communication system and a communication method.

BACKGROUND ART

Recently, wireless communication technologies in which various types of data are transmitted and received through close proximity wireless communication have been developed.

For example, TransferJet (registered trademark) is used in digital cameras and personal computers (PCs) as a close proximity wireless communication scheme, and used to build an ecosystem for data communication among information processing apparatuses. Specifications of TransferJet were standardized by the TransferJet Consortium, and almost the same international standards as the specifications according to the TransferJet Consortium are registered as ECMA 398 disclosed in the following Non-Patent Literature 1.

In addition, in Patent Literature 1, a method of efficiently establishing, maintaining and releasing a wireless connection in wireless communication technology is disclosed.

CITATION LIST

Patent Literature

Patent Literature 1: JP 4840043B

Non-Patent Literature

Non-Patent Literature 1: ECMA-398

SUMMARY OF INVENTION

Technical Problem

In both technologies disclosed in the above Patent Literature and Non-Patent Literature, wireless communication is performed through half-duplex communication channels. However, in recent years, with the increase of applications for which full-duplex communication is necessary, support of full-duplex communication through half-duplex communication channels is necessary.

In view of the above circumstance, the present disclosure proposes a communication apparatus, a communication system and a communication method which are novel and improved and through which it is possible to support full-duplex communication over half-duplex communication channels.

Solution to Problem

According to the present disclosure, there is provided a communication apparatus including: a switch unit configured to switch data communication to be performed with another communication apparatus on a transmission side or a reception side; and a communication unit configured to transmit transmission data to the other communication apparatus and receive a response when the data communication is performed on the transmission side, and receive reception data from the other communication apparatus and transmit a response when the data communication is performed on the reception side. The switch unit performs switching from the transmission side to the reception side when the response received by the communication unit includes a switching instruction.

According to the present disclosure, there is provided a communication system including: a first communication apparatus configured to perform data communication on a transmission side and a second communication apparatus configured to perform data communication on a reception side. The first communication apparatus includes a first switch unit configured to perform switching from the transmission side to the reception side, and a first communication unit configured to transmit transmission data to the second communication apparatus and receive a response. The second communication apparatus includes a second switch unit configured to perform switching from the reception side to the transmission side, and a second communication unit configured to receive the transmission data from the first communication apparatus and transmit the response. The second switch unit performs switching from the reception side to the transmission side when the response including a switching instruction is transmitted by the second communication unit, and the first switch unit performs switching from the transmission side to the reception side when the response is received by the first communication unit.

According to the present disclosure, there is provided a communication method including: switching data communication to be performed with another communication apparatus on a transmission side or a reception side; transmitting transmission data to the other communication apparatus and receiving a response when the data communication is performed on the transmission side and receiving reception data from the other communication apparatus and transmitting a response when the data communication is performed on the reception side; and performing switching from the transmission side to the reception side when the received response includes a switching instruction.

Advantageous Effects of Invention

According to the present disclosure described above, it is possible to support full-duplex communication over half-duplex communication channels. Also, the above effects are not necessarily limited, but along with the effects or instead of the effects, any effect shown in this specification or other effects that may be understood from this specification may be achieved.

DESCRIPTION OF EMBODIMENTS

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will proceed in the following order.
1. Overview of communication system according to an embodiment of the present disclosure
2. First Embodiment
2-1. Configuration of communication apparatus
2-2. Arbitration of transmission right
2-2-1. Arbitration by ACK frame
2-2-2. Arbitration by token frame
2-2-3. One example of transmission right arbitrating operation
2-3. Sleep for very short time
2-4. Operating process
3. Summary <1. Overview of Communication System According to an Embodiment of the Present Disclosure>

First, an overview of a communication system according to an embodiment of the present disclosure will be described with reference to FIGS. 1 and 2. Specifically, an overview of a communication system based on TransferJet will be described.

Figure 1:
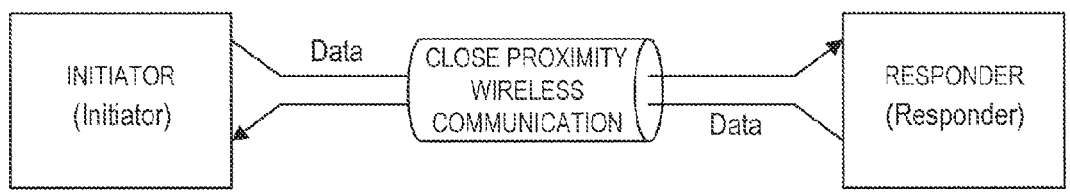
FIG. 1 is a diagram schematically illustrating two devices of a communication system according to an embodiment of the present disclosure.

FIG. 1 is a diagram schematically illustrating two devices (communication apparatuses) of the communication system according to an embodiment of the present disclosure. As illustrated in FIG. 1, the communication system according to the present embodiment includes a communication method whose object is to transmit and receive data between a pair of devices and wirelessly transmits and receives data between the devices at a short distance. The two devices have a role of a responder or an initiator. The initiator is a "side at which a connection request is issued" and the responder is a "side at which a connection request is received." In the present embodiment, one to one (P2P) communication is performed. At the time of connection, the initiator issues a connection request and the responder is in a standby state. However, their roles are different only during the connection, and the devices have the same configuration related to the connection. Examples of the initiator include a PC, a portable device, and an electronic card. Examples of the responder include devices such as a PC, a portable device, and an electronic card.

FIG. 1 schematically illustrates a state in which devices of the present embodiment wirelessly communicate with each other through physical layers thereof. While close proximity wireless communication is performed through a physical layer using TransferJet in the present embodiment, the physical layer is not limited thereto, but a general-purpose physical layer for communication can be applied. Since the physical layer using TransferJet uses a connection layer service data unit (CSDU), it is particularly appropriate for communication of a large amount of data such as photos and videos.

Here, TransferJet is a near field wireless communication scheme using a 4.48 GHz band. When a communication protocol (TransferJet) thereof is used, radio waves of 4.48 GHz are used at −70 dBm/MHz and below and high-speed near field data communication of a maximum of 560 Mbps can be implemented. In addition, when a communication distance in near field wireless communication is limited to several cm, it is possible to perform a communication process at a high speed, implement a communication apparatus in a small size, and reduce power consumption. Next, a protocol stack of TransferJet will be described with reference to FIG. 2.

Figure 2:
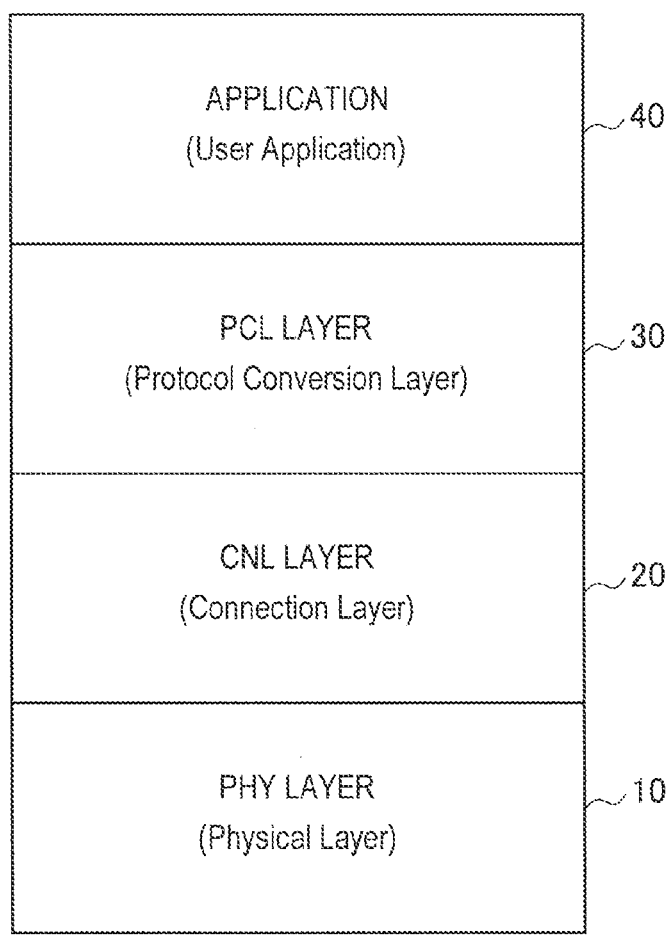
FIG. 2 is a diagram illustrating a protocol stack of TransferJet.

FIG. 2 is a diagram illustrating a protocol stack of TransferJet. As illustrated in FIG. 1, the protocol stack of TransferJet includes a physical layer (PHY layer) 10, a connection layer (CNL layer) 20, a protocol conversion layer (PCL layer) 30, and an application (user application) 40.

The PHY layer 10 is a layer that actually performs wireless communication, and performs half-duplex (unidirectional) communication. The CNL layer 20 is a layer that performs one-to-one control or media access control and is optimized for half-duplex communication. The PCL layer 30 has a function of mapping the application 40 to the CNL layer 20, and converts existing interface specifications, for example, Small Computer System Interface (SCSI) and OBject EXchange (OBEX). The application 40 uses existing interface specifications, for example, SCSI and OBEX.

When TransferJet was initially introduced, half-duplex protocols such as SCSI and OBEX were used in the application 40. However, in recent years, full-duplex (bidirectional) protocols such as Transmission Control Protocol/Internet Protocol (TCP/IP) or universal asynchronous receiver transmitter (UART) of Serial have been increasingly used.

However, since the CNL layer 20 performs half-duplex communication, when the application 40 uses the full-duplex protocol, collisions of packets may occur over a wireless transmission channel, which may decrease the throughput. Such collisions of packets will be described in detail below with reference to FIG. 3.

Figure 3:
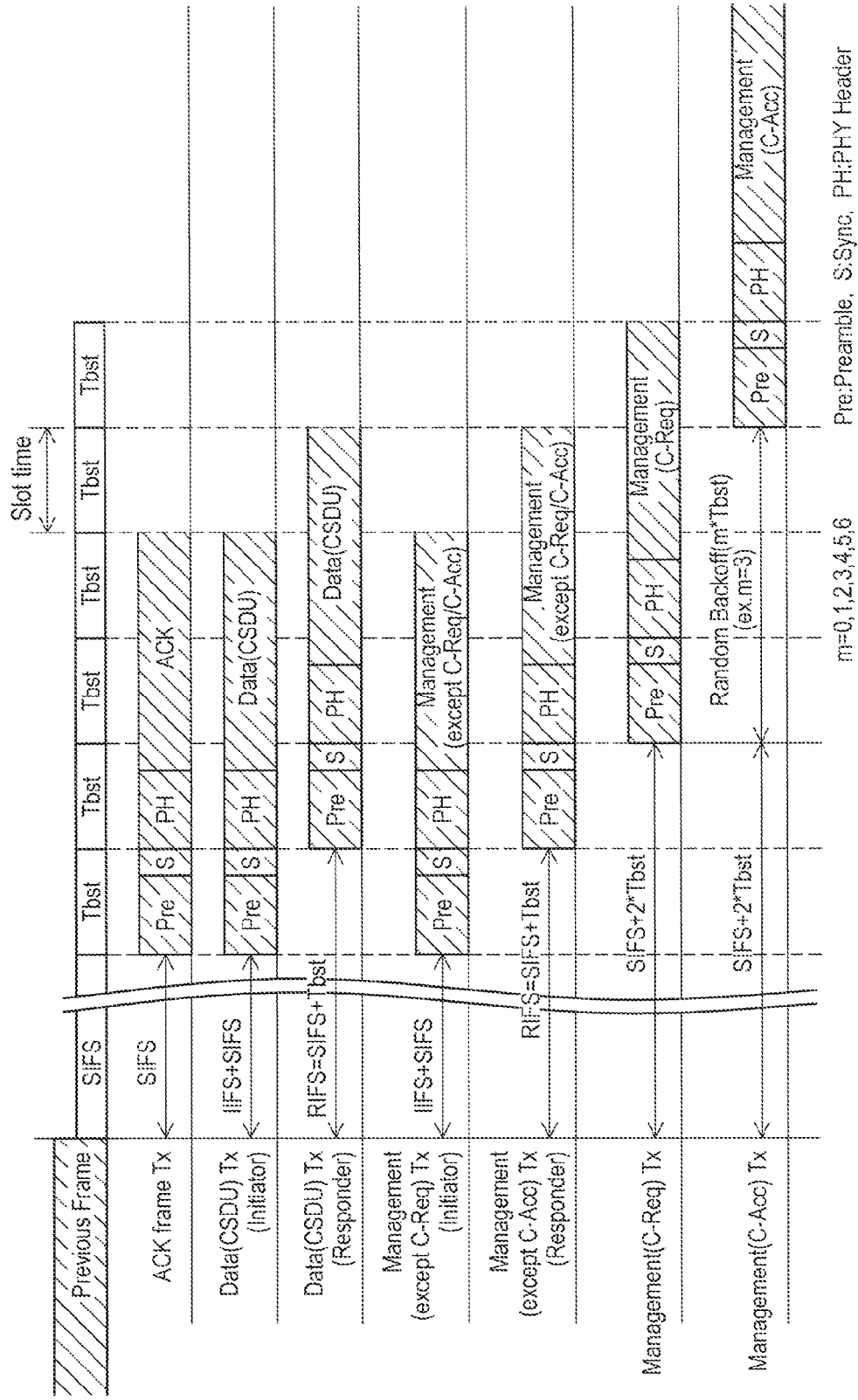
FIG. 3 is a diagram for describing an inter frame space in TransferJet.

FIG. 3 is a diagram for describing an inter frame space (IFS) in TransferJet. As illustrated in FIG. 3, the inter frame space represents a time interval between a previous frame and the next frame. As illustrated in FIG. 3, in TransferJet, frames, an ACK frame (an ACK Frame Tx), a CSDU frame of the initiator (DATA (CSDU) Tx (initiator)), a CSDU frame of a responder (DATA (CSDU) Tx (responder)), a management frame of the initiator (Management (exception C-Req) TX (initiator)), a management frame of the responder (Management (except C-Acc) TX (responder)), a connection request management frame (Management (C-Req) Tx), and a connection accept response management frame (Management (C-Acc) Tx), are defined. The frame illustrated in FIG. 3 has a configuration in which a preamble (Pre), synchronization S (Sync), and a physical layer header (PHY) are included in common, and a frame body is subsequent thereto. For example, in the CSDU frame, a maximum of two CSDUs are stored in a frame body. The communication system can exchange data passed from the upper layer by the CSDU frame.

As illustrated in FIG. 3, transmission of the ACK frame is started at an SIFS interval from the previous frame. Similarly, transmission of the CSDU frame and the management frame of the initiator is started at an IIFS interval. Here, the IIFS interval and the SIFS interval are the same. In addition, the CSDU frame and the management frame of the responder are transmitted at an RIFS interval that is only Tbst longer than SIFS. In addition, the connection request is normally transmitted at an interval of 100 μsec. However, when a frame transmitted by another apparatus is detected in the wireless transmission channel at a timing at which the connection request is transmitted, transmission is performed at an interval that is only two Tbsts longer than SIFS from the frame transmitted by the other apparatus. The connection accept response is transmitted at an interval that is two Tbsts and a random backoff (an integer multiple of Tbst) longer than SIFS. Specific values of SIFS, IIFS, RIFS, and Tbst are shown in the following Table 1.

TABLE 1

| Parameter name | Value | Description |
| --- | --- | --- |
| SIFS | minimum: 8.5 μsec/maximum: 11.5 μsec | Short inter frame space |
| IIFS | minimum: 8.5 μsec IIFS shall be greater or equal to SIFS | Initiator minimum inter frame space |
| RIFS | minimum: 15.7 μsec RIFS shall be greater or equal to SIFS + Tbst | Responder minimum inter frame space |
| Tbst | 8 μsec ± 10% | Slot time |

As illustrated in FIG. 3, the initiator can transmit the CSDU frame after the IIFS elapses after the previous frame. That is, as shown in Table 1, the initiator acquires a transmission right after the IIFS (a minimum of 8.5 μsec (microseconds)) elapses in an idle state of wireless media. On the other hand, as illustrated in FIG. 3, the responder can transmit the CSDU frame after the RIFS elapses after the previous frame. That is, as shown in Table 1, the responder acquires a transmission right after the RIFS (a minimum of 15.7 μsec) elapses in an idle state of the wireless media.

Therefore, when an idle period of the wireless media has reached the RIFS, both of the initiator and the responder have the transmission right. Therefore, when both simultaneously start transmission of the CSDU frame, frames collide over the wireless media.

Accordingly, the communication system according to an embodiment of the present disclosure has been created in view of the above circumstances. The communication system according to the present embodiment can support full-duplex communication over a half-duplex communication channel. Since the communication system according to the present embodiment supports full-duplex communication in which full duplex control is performed, it is possible to prevent frames from colliding and the throughput from decreasing as described above.

In this specification, an example in which technology according to an embodiment of the present disclosure is applied in TransferJet will be described as exemplary wireless technology. Hereinafter, a communication process defined in ECMA-398 (Non-Patent Literature 1) will be referred to as a comparison scheme, and a communication process in which technology according to an embodiment of the present disclosure is applied will be referred to as a proposed scheme.

The overview of the communication system according to an embodiment of the present disclosure has been described above. Next, content of the communication system according to an embodiment of the present disclosure will be described in detail.

<2. First Embodiment>

[2-1. Configuration of Communication Apparatus]

Figure 4:
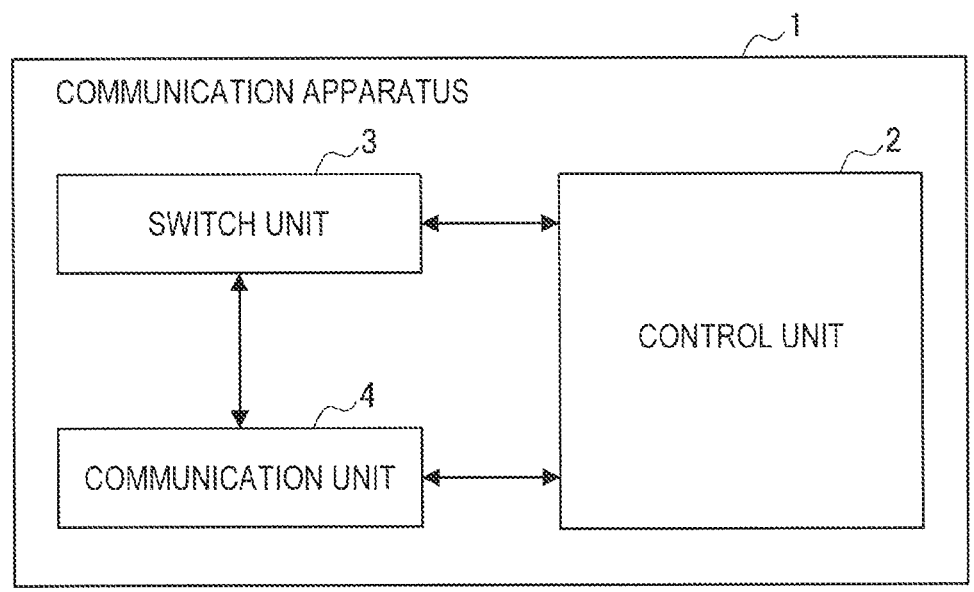
FIG. 4 is a block diagram illustrating a configuration of a communication apparatus according to a first embodiment.

FIG. 4 is a block diagram illustrating a configuration of a communication apparatus 1 according to a first embodiment. As illustrated in FIG. 4, the communication apparatus 1 includes a control unit 2, a switch unit 3, and a communication unit 4. The communication apparatus 1 communicates with another communication apparatus according to any role of the responder and the initiator. The communication apparatus 1 and the other communication apparatus that communicates with the communication apparatus 1 and has the same configuration as the communication apparatus 1 are referred to as a communication system below.

(Control Unit 2)

The control unit 2 serves as an arithmetic processing unit and a control device, and controls overall operations of the communication apparatus 1 according to various programs. The control unit 2 is implemented by, for example, a central processing unit (CPU) and a microprocessor. The control unit 2 may also include a read only memory (ROM) configured to store programs and calculation parameters to be used and a random access memory (RAM) configured to temporarily store parameters that are appropriately changed.

In the present embodiment, the control unit 2 is connected to the communication unit 4 and controls transmission and reception of various types of data performed with another communication apparatus connected through the communication unit 4. In addition, the control unit 2 is connected to the switch unit 3 and performs switching of a talker and a listener to be described below through the switch unit 3. The other communication apparatus connected through the communication unit 4 is simply referred to as a partner device below.

(Switch Unit 3)

In the present embodiment, two communication apparatuses whose communication is established by TransferJet have a role of a talker (a transmission side) or a listener (a reception side). The talker is a side at which a transmission right is provided and a CSDU frame is transmitted. The listener is a side at which no transmission right is provided and a CSDU frame is received. The switch unit 3 according to the present embodiment has a function of switching the role in data communication with the partner device to that of the talker or the listener based on control by the control unit 2. For example, the switch unit 3 switches the talker and the listener based on whether there is data to be transmitted and whether a switching instruction (an ACK frame in which a talk flag to be described below is set) from the partner device is received by the communication unit 4.

(Communication Unit 4)

The communication unit 4 refers to a communication module configured to perform close proximity wireless communication based on control by the control unit 2. For example, the communication unit 4 is configured by an induced-electric-field-coupling type coupler and performs close proximity wireless communication with an external device according to TransferJet. More specifically, the communication unit 4 performs close proximity wireless communication with another communication apparatus (a communication apparatus having a close proximity wireless communication function) that is within a predetermined communication range from the communication unit 4. Here, close proximity wireless communication between the communication unit 4 and the other communication apparatus is possible only when the communication unit 4 and the other communication apparatus are in a proximity state. Here, the term "proximity state" refers to, for example, a state in which the communication unit 4 and the other communication apparatus are within a predetermined range (for example, 3 cm) from or in contact with each other.

The communication unit 4 transmits and receives the frames such as the ACK frame, the CSDU frame, the management frame, the connection request frame, and the connection accept response frame, which have been described with reference to FIG. 3, to and from the partner device. In particular, in the present embodiment, the communication unit 4 transmits the CSDU frame (transmission data) to the partner device and receives the ACK frame (response) in the case of the talker. Otherwise, the communication unit 4 receives the CSDU frame (reception data) from the partner device and transmits the ACK frame (response) in the case of the listener.

The configuration of the communication apparatus 1 according to the present embodiment has been described above. Next, arbitration of the transmission right by the communication system according to the present embodiment will be described with reference to FIGS. 5 to 7.

[2-2. Arbitration of Transmission Right]

The communication system according to the present embodiment performs arbitration of the transmission right by the ACK frame or arbitration of the transmission right by a dedicated frame (a token frame) for transmission right arbitration. First, arbitration of the transmission right by the ACK frame will be described with reference to FIG. 5.

[2-2-1. Arbitration by ACK Frame]

Figure 5:
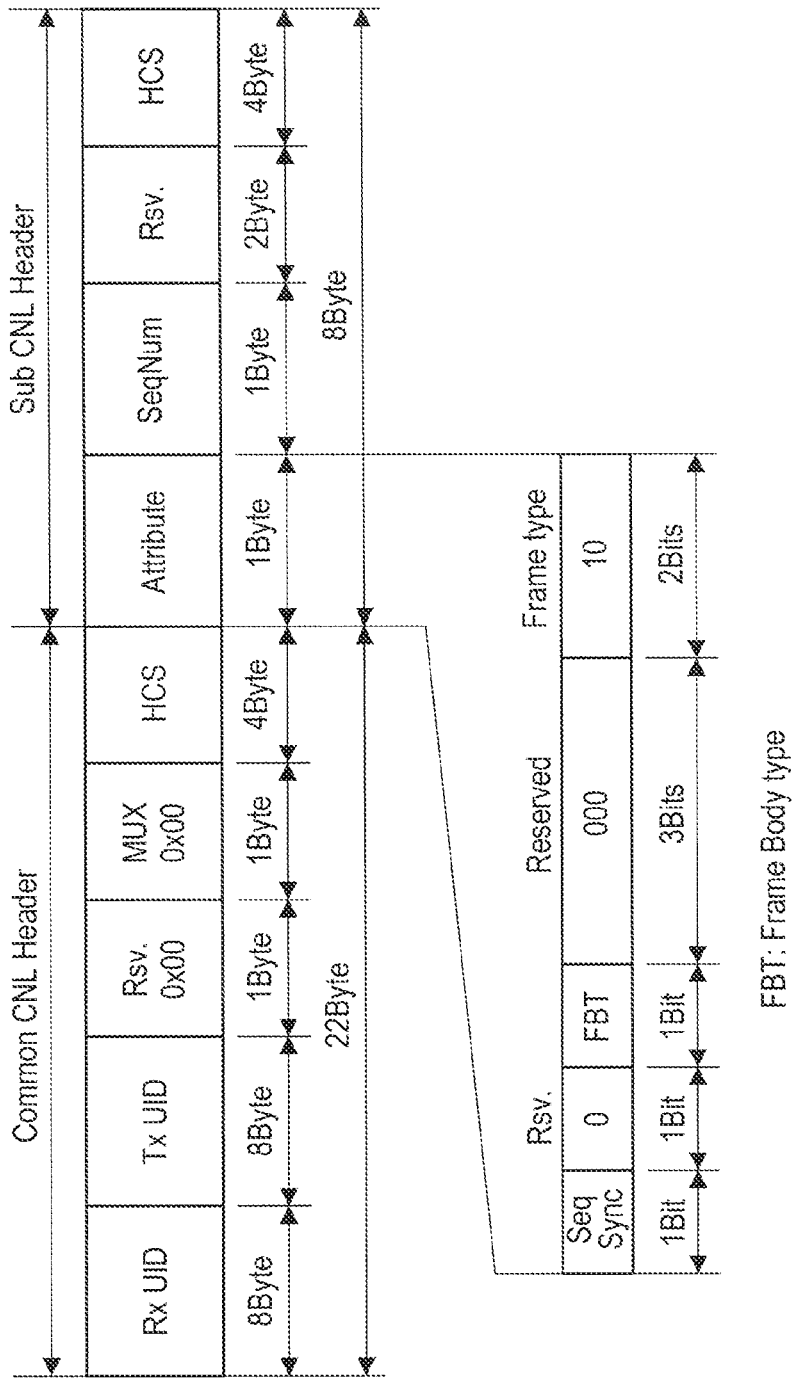
FIG. 5 is a diagram illustrating a format of an ACK frame of TransferJet.

FIG. 5 is a diagram illustrating a format of the ACK frame in TransferJet. As illustrated in FIG. 5, the ACK frame includes a common CNL header and a sub CNL header.

As illustrated in FIG. 5, the common CNL header includes Rx UID, Tx UID, Rsv., MUX, and HCS. The Rx UID is an 8-byte field in which a unique ID (UID) of a transmission destination is stored. The Tx UID is an 8-byte field in which a UID of a reception destination is stored. The Rsv. is a 1-byte field serving as a reserved area. The MUX is a 1-byte field in which a multiplex number of the frame body is stored. The HCS is a 4-byte field in which a header check sequence is stored.

As illustrated in FIG. 5, the sub CNL header includes Attribute, SeqNum, Rsv., and HCS. The Attribute is a field in which information indicating an attribute of a frame is stored, which will be described in detail below. In addition, the SeqNum is a 1-byte field in which a sequence number assigned for frame body management in the CNL layer is stored. The Rsv. is a 2-byte field serving as a reserved area. The HCS is a 4-byte field in which a header check sequence is stored.

Next, content of the Attribute will be described. As illustrated in FIG. 5, the Attribute includes Seq Sync, Rsv., FBT, Reserved, and Frame type. The Seq Sync is a 1-bit field in which a flag of synchronization is stored. The Rsv. is a 1-bit field serving as a reserved area. The Frame Body type (FBT) is a 1-bit field in which a type of a frame body that indicates, for example, an ACK for the CSDU frame or an ACK for the management frame, is stored. The Reserved is a 3-bit area serving as a reserved area. The Frame type is a 2-bit area in which a type of a frame that indicates the CSDU frame, the ACK frame or the management frame is stored.

The communication system according to the present embodiment uses the Reserved field of the sub CNL header in order to arbitrate the transmission right. More specifically, the communication system according to the present embodiment arbitrates the transmission right based on whether a flag (a talk flag) indicating a request of the transmission right is set in the Reserved field of the ACK frame.

The communication apparatus 1 sets the talk flag in the ACK frame and thus acquires the transmission right. More specifically, when the communication apparatus 1 has the role of the listener and there is data to be transmitted, the switch unit 3 switches the role from that of the listener to that of the talker. Accordingly, the communication unit 4 transmits the ACK frame including the talk flag (the switching instruction) to the partner device. Therefore, since the communication apparatus 1 has the role of the talker and the partner device has the role of the listener, the communication unit 4 stores data to be transmitted in the CSDU frame and transmits the frame to the partner terminal.

On the other hand, when the ACK frame in which the talk flag is set is received, the communication apparatus 1 transfers the transmission right to the partner device. More specifically, when the communication apparatus 1 has the role of the talker and the ACK frame received by the communication unit 4 includes the talk flag (the switching instruction), the switch unit 3 switches the role of the communication apparatus 1 from that of the talker to that of the listener. Accordingly, since the communication apparatus 1 has the role of the listener and the partner device has the role of the talker, the communication unit 4 can receive the CSDU frame from the partner terminal.

If both the communication apparatus 1 and the partner device have data to be transmitted, when the ACK frame in which the talk flag is set is transmitted after both receive the CSDU frame from the partner, the transmission right is acquired and its own CSDU frame is transmitted. That is, both alternately acquire the transmission right and transmit the CSDU frame. That is, it is possible to transmit the CSDU frame substantially simultaneously. In this manner, when the communication system according to the present embodiment switches the role of communication apparatuses according to arbitration of the transmission right by the ACK frame, it is possible to implement full duplex control.

Here, an application (the application 40 in FIG. 2) of an upper layer uses a full-duplex communication specification in some cases. For example, in a TCP/IP protocol, which is one full-duplex communication specification, the transmission side performs arrival confirmation when an ACK response is received after data transmission. On the other hand, when there is no ACK response, the transmission side delays data transmission and retransmits data.

In the comparison scheme, it is difficult for the responder to transmit the CSDU frame at an appropriate timing as in the present embodiment. More specifically, as illustrated in FIG. 3, in order to transmit the CSDU frame from the responder to the initiator, it is necessary that the inter frame space RIFS have elapsed. Therefore, while the CSDU frame is transmitted from the initiator to the responder at an IIFS interval, it is difficult to transmit the CSDU frame in which the ACK response in the TCP/IP protocol is stored from the responder to the initiator. Accordingly, in the comparison scheme, when it is not possible to receive the ACK response at an appropriate timing after an application of the initiator transmits a TCP/IP packet, data transmission is delayed and data is retransmitted.

On the other hand, in the communication system according to the present embodiment, even when the initiator performs data transmission in order to perform the full duplex control described above, the responder can transmit the CSDU frame in which the ACK response in the TCP/IP protocol is stored. Therefore, since the initiator can perform arrival confirmation according to the ACK response, there is no need to delay data transmission or retransmit data. Accordingly, when the application of the upper layer uses the full-duplex communication specification, the communication system according to the present embodiment can implement a higher transmission rate than the comparison scheme.

In addition, since the communication system according to the present embodiment performs arbitration of the transmission right by the ACK frame, as described with reference to FIG. 3 and Table 1, no situation in which both have the transmission right occurs, and thus no collision of frames occurs. In addition, the communication system according to the present embodiment performs full duplex control by arbitration of the transmission right using a reserved area of an existing frame configuration. Accordingly, when the communication system according to the present embodiment adds a dedicated frame for performing arbitration of the transmission right, it is possible to prevent the throughput from decreasing.

Arbitration of the transmission right by the ACK frame has been described above. Next, arbitration of the transmission right by the token frame will be described.

[2-2-2. Arbitration by Token Frame]

The communication system according to the present embodiment starts a procedure of exchanging a dedicated frame (a token frame) for performing arbitration of the transmission right only when data communication is not performed. Since the token frame is exchanged while data communication is not performed, there is no influence on the throughput due to exchange of the token frame.

The token frame is implemented using an existing management frame. First, the existing management frame of TransferJet will be described with reference to FIG. 6.

Figure 6:
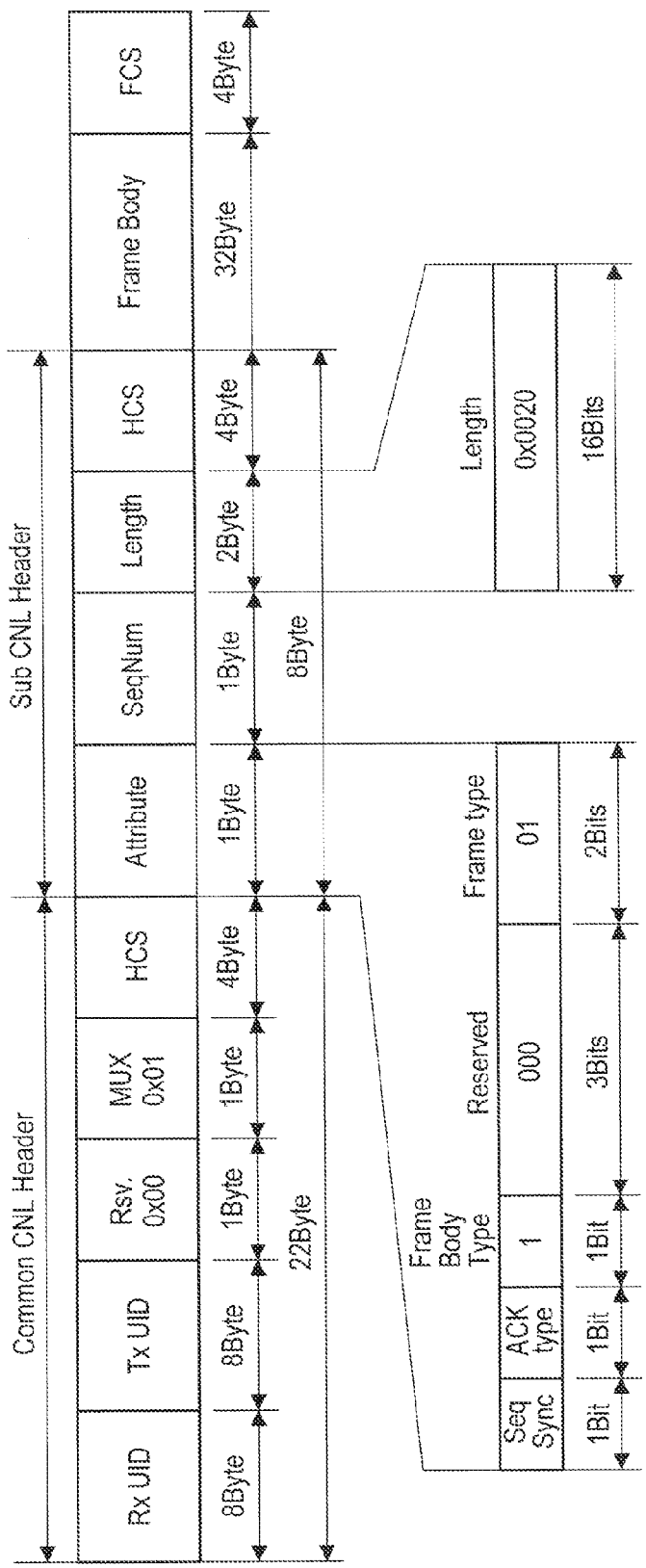
FIG. 6 is a diagram illustrating a format of a management frame of TransferJet.

FIG. 6 is a diagram illustrating a format of a management frame of TransferJet. As illustrated in FIG. 6, the management frame includes a common CNL header, a sub CNL header, a frame body, and an FCS. Since the common CNL header is the same as that described with reference to FIG. 5, detailed description thereof will be omitted herein. The frame body is a 32-byte field in which control information is stored. The FCS is a 4-byte field in which a frame check sequence is stored.

As illustrated in FIG. 6, the sub CNL header includes Attribute, SeqNum, Length, and HCS. The Attribute is a field in which information indicating an attribute of a frame is stored, which will be described below in detail. The Length is a 2-byte field in which a length of a frame body is stored. Note that, since the HCS and the SeqNum are the same as those described with reference to FIG. 5, detailed descriptions thereof will be omitted herein.

Next, content of the Attribute will be described. As illustrated in FIG. 6, the Attribute includes Seq Sync, ACK type, Frame Body type, Reserved, and Frame type. The ACK type is a 1-bit field in which information indicating either an ImACK for which an ACK response is necessary or a NoACK for which an ACK response is not necessary is stored. Also, since the Seq Sync, the Frame Body type, the Reserved, and the Frame type are the same as those described with reference to FIG. 5, detailed descriptions thereof will be omitted herein.

The format of the management frame of TransferJet has been described above. Next, an exemplary configuration of the management frame for implementing the token frame will be described with reference to FIG. 7.

Figure 7:
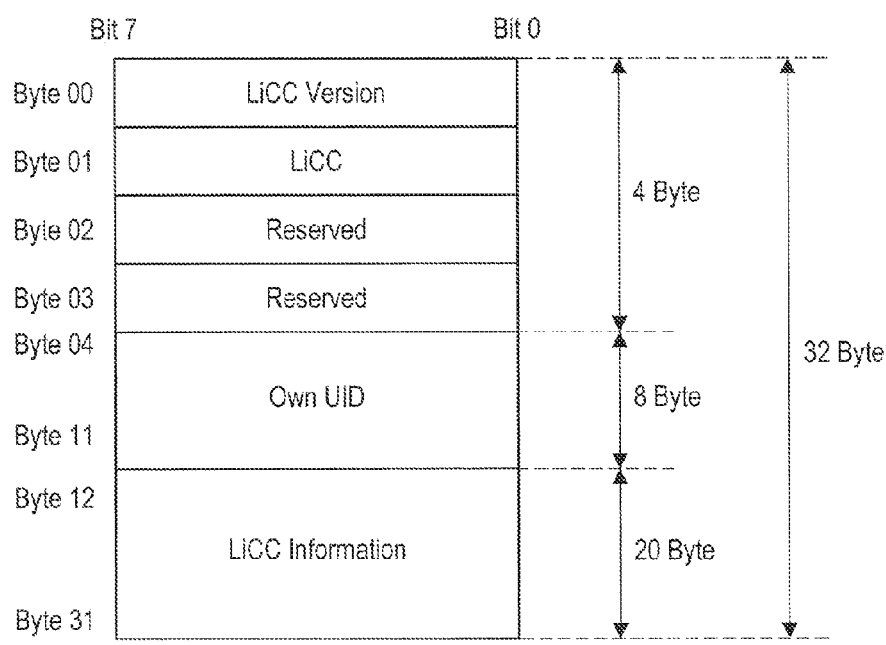
FIG. 7 is a diagram illustrating a format of a frame body of a management frame of TransferJet.

FIG. 7 is a diagram illustrating a format of a frame body of a management frame of TransferJet. As illustrated in FIG. 7, the frame body includes LiCC Version, LiCC, two Reserveds, Own UID, and LiCC information. The link control command (LiCC) is a 1-byte field in which a command for connection control is stored. The LiCC type is a 1-byte field in which a version thereof is stored. The Reserved is a 1-byte field serving as a reserved area. The Own UID is an 8-byte field in which an own UID is stored. The LiCC information is a 20-byte field in which various types of information about a command (LiCC) for connection control are stored.

Next, content of the frame body in the management frame and relevant setting information are shown in Table 2.

TABLE 2

| Content of frame body | LiCC type | Value of ACK type | Allowable Rx UID type |
| --- | --- | --- | --- |
| Connection request (C-Req) | 0x01 | 1 (NoACK) | Any UID (including Paging UID) |
| Connection accept (C-Acc) | 0x02 | 0 (ImACK) | Any UID except the Paging UID |
| Connection release (C-Rls)) | 0x03 | 1 (NoACK) | Any UID except the Paging UID |
| Connection sleep (C-Sleep) | 0x08 | 0 (ImACK) | Any UID except the Paging UID |
| Connection wake (C-Wake)) | 0x09 | 0 (ImACK) | Any UID except the Paging UID |
| Connection probe (C-Probe) | 0x0A | 0 (ImACK) | Any UID except the Paging UID |

The communication system according to the present embodiment assigns, for example, "0x0B," to the LiCC type as a value for the token frame. The ACK type in the token frame is ImACK for which an ACK response is necessary. That is, the communication system according to the present embodiment uses a management frame in which the ACK type of the sub CNL header is set as ImACK and the LiCC of the frame body is set to 0x0B as the dedicated frame (the token frame) for arbitration of the transmission right.

The exemplary configuration of the token frame has been described above.

The communication system according to the present embodiment performs arbitration of the transmission right by the token frame described above. The ACK type of the token frame is ImACK for which an ACK response is necessary. Accordingly, when neither the talker nor the listener has data to be transmitted, the communication system according to the present embodiment performs arbitration of the transmission right by continuously performing transmission of the token frame and the ACK response.

More specifically, when the communication apparatus 1 has the role of the talker and there is no data to be transmitted, the communication unit 4 transmits a token frame (a transmission right arbitration frame) in place of the CSDU frame (transmission data) to the partner device and receives the ACK frame. When no talk flag is set in the received ACK frame, the communication unit 4 continuously transmits the token frame. Then, when data to be transmitted is generated while the ACK frame in which the talk flag is set is not received, the communication unit 4 transmits the CSDU frame.

On the other hand, when the communication apparatus 1 has the role of the listener and there is no data to be transmitted, the communication unit 4 transmits the ACK frame in which no talk flag is set to the partner device as a response to the token frame. Then, when data to be transmitted is generated, the communication unit 4 acquires the transmission right by transmitting the ACK frame in which the talk flag is set to the partner device.

In this manner, the communication system according to the present embodiment continuously performs transmission of the token frame and the ACK response when there is no data to be transmitted, and performs arbitration of the transmission right within a framework of such an exchange when data to be transmitted is generated. Therefore, unlike the comparison scheme, as described with reference to FIG. 3 and Table 1, since both do not have the transmission right after a predetermined time in an idle state, collision of frames does not occur.

Here, the communication apparatus 1 has three states, a transmission state in which any frame is transmitted, a reception state in which any frame is received, and a frame detection operation state in which a preamble serving as a header of a frame is detected without performing transmission and reception. In an electronic circuit used in the communication apparatus 1, the frame detection operation state has higher power consumption than the other states in some cases. In particular, in TransferJet, since transmission power for performing communication in a proximity state of about 3 cm is low and power for reception is also low, the frame detection operation state has higher power consumption than the other states in many cases. In this regard, in the communication system according to the present embodiment, since the communication apparatus 1 and the partner device are usually in either the transmission state or the reception state as the talker or the listener, it is possible to avoid the frame detection operation state, thereby reducing power consumption.

In addition, in a general wireless communication specification, in order to prevent interference, communication is stopped when there is no transmission data. However, in TransferJet, a risk of interference is low since communication is performed with low transmission power in a proximity state of about 3 cm, and thus it is possible to perform transmission and reception constantly by applying technology according to the present embodiment.

Arbitration of the transmission right by the token frame has been described above. Next, an example of a transmission right arbitrating operation will be described with reference to FIGS. 8 and 9.

[2-2-3. One Example of Transmission Right Arbitrating Operation]

Figure 8:
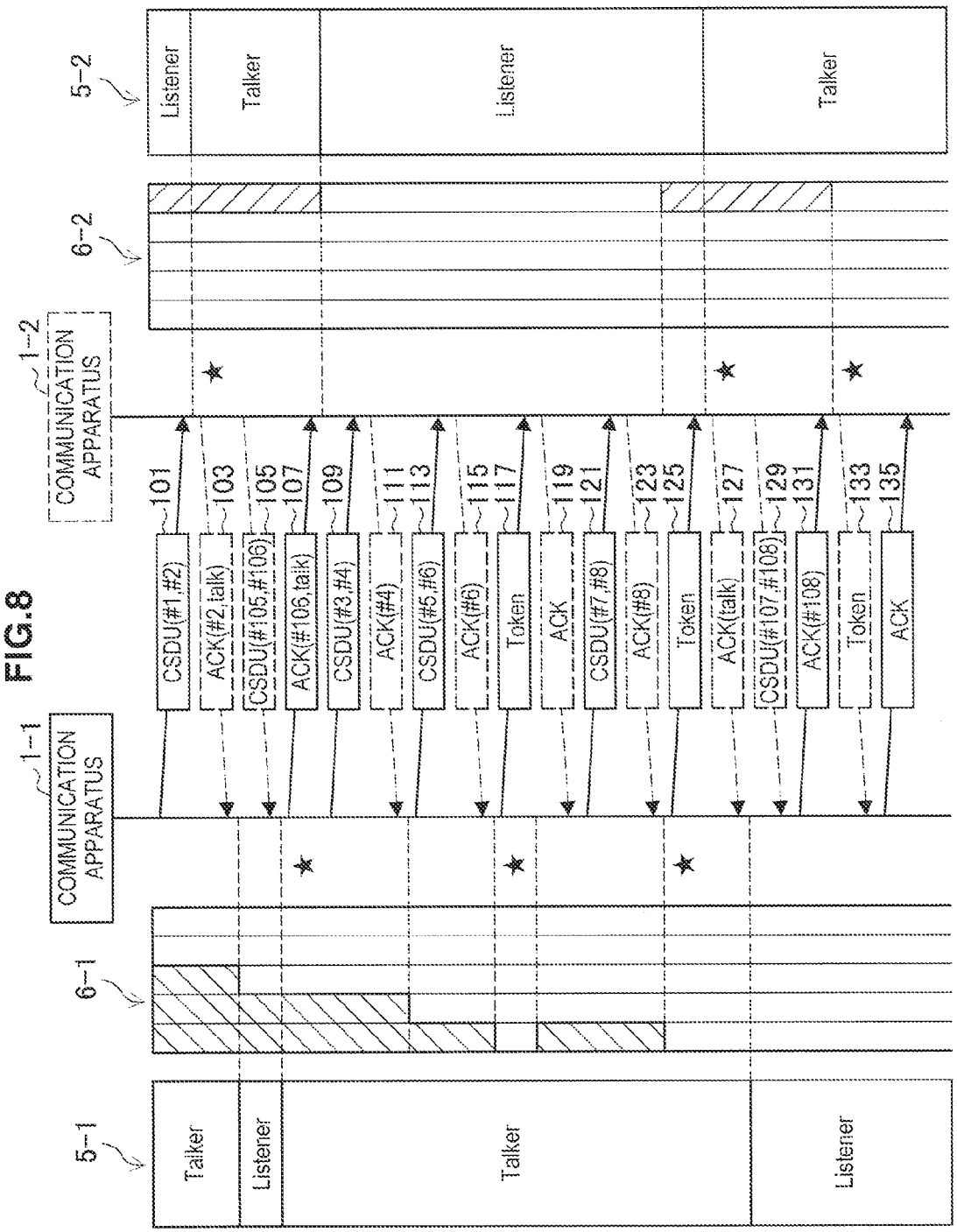
FIG. 8 is a diagram illustrating an example of a transmission right arbitrating operation according to the first embodiment.

FIG. 8 is a diagram illustrating an example of a transmission right arbitrating operation according to the first embodiment. FIG. 8 illustrates an example in which a communication apparatus 1-1 (a first communication apparatus) and a communication apparatus 1-2 (a second communication apparatus) perform data communication while performing arbitration of the transmission right. Note that the communication apparatus 1-1 corresponds to the initiator, and the communication apparatus 1-2 corresponds to the responder. Roles 5-1 and 5-2 show roles (a talker and a listener) of the communication apparatuses 1-1 and 1-2. Transmission buffers 6-1 and 6-2 show amounts of remaining data to be transmitted by the communication apparatuses 1-1 and 1-2. One square of the transmission buffers 6-1 and 6-2 corresponds to two CSDUs. Note that the star symbols "★" in the drawing indicate parts different from the comparison scheme.

As illustrated in FIG. 8, first, the communication apparatus 1-1 serving as the talker transmits a CSDU frame 101 in which two CSDUs of sequence numbers #1 and #2 are stored to the communication apparatus 1-2 serving as the listener.

Next, the communication apparatus 1-2 transmits an ACK frame 103 indicating reception up to the CSDU of sequence number #2 to the communication apparatus 1-1 as a response to the CSDU frame 101. In this case, since the transmission buffer 6-2 has data to be transmitted, the communication apparatus 1-2 sets the talk flag in the ACK frame 103. Accordingly, the communication apparatus 1-2 changes the role 5-2 from that of the listener to that of the talker. In addition, the communication apparatus 1-1 that has received the ACK frame 103 in which the talk flag is set changes the role 5-1 from that of the talker to that of the listener. In addition, the communication apparatus 1-1 deletes data that has been completely transmitted from the transmission buffer 6-1 with the reception of the ACK frame 103.

Next, the communication apparatus 1-2 serving as the talker transmits a CSDU frame 105 in which two CSDUs of sequence numbers #105 and #106 are stored to the communication apparatus 1-1 serving as the listener.

Next, the communication apparatus 1-1 transmits an ACK frame 107 indicating reception up to the CSDU of sequence number #106 to the communication apparatus 1-2 as a response to the CSDU frame 105. In this case, since the transmission buffer 6-1 has data to be transmitted, the communication apparatus 1-1 sets the talk flag in the ACK frame 107. Accordingly, the communication apparatus 1-1 changes the role 5-1 to that of the talker. In addition, the communication apparatus 1-2 changes the role 5-2 to that of the listener and deletes data that has been completely transmitted from the transmission buffer 6-2 with the reception of the ACK frame 107 in which the talk flag is set.

In this manner, when both the communication apparatus 1-1 and the communication apparatus 1-2 have data to be transmitted, the CSDU frame is alternately transmitted.

Next, the communication apparatus 1-1 serving as the talker transmits a CSDU frame 109 in which two CSDUs of sequence numbers #3 and #4 are stored to the communication apparatus 1-2 serving as the listener.

Next, the communication apparatus 1-2 transmits an ACK frame 111 indicating reception up to the CSDU of sequence number #4 to the communication apparatus 1-1 as a response to the CSDU frame 109. In this case, since the transmission buffer 6-2 has no data to be transmitted, the communication apparatus 1-2 does not set the talk flag in the ACK frame 111. The communication apparatus 1-1 deletes data that has been completely transmitted from the transmission buffer 6-1 with the reception of the ACK frame 111.

Next, the communication apparatus 1-1 serving as the talker continuously transmits a CSDU frame 113 in which two CSDUs of sequence numbers #5 and #6 are stored to the communication apparatus 1-2 serving as the listener. In this manner, when the ACK frame in which no talk flag is set is received, the talker can consecutively transmit the CSDU frame.

Next, the communication apparatus 1-2 transmits an ACK frame 115 indicating reception up to the CSDU of sequence number #6 to the communication apparatus 1-1 as a response to the CSDU frame 113. In this case, since the transmission buffer 6-2 has no data to be transmitted, the communication apparatus 1-2 does not set the talk flag in the ACK frame 115. The communication apparatus 1-1 deletes data that has been completely transmitted from the transmission buffer 6-1 with the reception of the ACK frame 115.

Next, since the role 5-1 is that of the talker and the transmission buffer 6-1 has no data to be transmitted, the communication apparatus 1-1 transmits a token frame 117 in place of the CSDU frame.

Next, the communication apparatus 1-2 transmits an ACK frame 119 to the communication apparatus 1-1 as a response to the token frame 117. In this case, since the transmission buffer 6-2 has no data to be transmitted, the communication apparatus 1-2 does not set the talk flag in the ACK frame 119. Also, in this case, data to be transmitted is generated in the communication apparatus 1-1.

Next, the communication apparatus 1-1 serving as the talker continuously transmits a CSDU frame 121 in which two CSDUs of sequence numbers #7 and #8 are stored to the communication apparatus 1-2 serving as the listener.

Next, the communication apparatus 1-2 transmits an ACK frame 123 indicating reception up to the CSDU of sequence number #8 to the communication apparatus 1-1 as a response to the CSDU frame 121. In this case, since the transmission buffer 6-2 has no data to be transmitted, the communication apparatus 1-2 does not set the talk flag in the ACK frame 123. The communication apparatus 1-1 deletes data that has been completely transmitted from the transmission buffer 6-1 with the reception of the ACK frame 123.

Next, since the role 5-1 is that of the talker and the transmission buffer 6-1 has no data to be transmitted, the communication apparatus 1-1 transmits a token frame 125 in place of the CSDU frame. Also, in this case, data to be transmitted is generated in the communication apparatus 1-2.

Next, the communication apparatus 1-2 transmits an ACK frame 127 to the communication apparatus 1-1 as a response to the token frame 125. In this case, since the transmission buffer 6-2 has data to be transmitted, the communication apparatus 1-2 sets the talk flag in the ACK frame 127. Accordingly, the communication apparatus 1-2 changes the role 5-2 to that of the talker. In addition, the communication apparatus 1-1 that has received the ACK frame 127 in which the talk flag is set changes the role 5-1 to that of the listener.

Next, the communication apparatus 1-2 serving as the talker transmits a CSDU frame 129 in which two CSDUs of sequence numbers #107 and #108 are stored to the communication apparatus 1-1 serving as the listener.

Next, the communication apparatus 1-1 transmits an ACK frame 131 indicating reception up to the CSDU of sequence number #108 to the communication apparatus 1-2 as a response to the CSDU frame 129. In this case, since the transmission buffer 6-1 has no data to be transmitted, the communication apparatus 1-1 does not set the talk flag in the ACK frame 131. The communication apparatus 1-2 deletes data that has been completely transmitted from the transmission buffer 6-2 with the reception of the ACK frame 131.

Next, since the role 5-2 is that of the talker and the transmission buffer 6-2 has no data to be transmitted, the communication apparatus 1-2 transmits a token frame 133 in place of the CSDU frame.

Next, the communication apparatus 1-1 transmits an ACK frame 135 to the communication apparatus 1-2 as a response to the token frame 133. In this case, since the transmission buffer 6-1 has no data to be transmitted, the communication apparatus 1-1 does not set the talk flag in the ACK frame 135.

The example of the transmission right arbitrating operation has been described above. Next, the inter frame space in the transmission right arbitrating operation described above with reference to FIG. 8 will be described with reference to FIG. 9.

Figure 9:
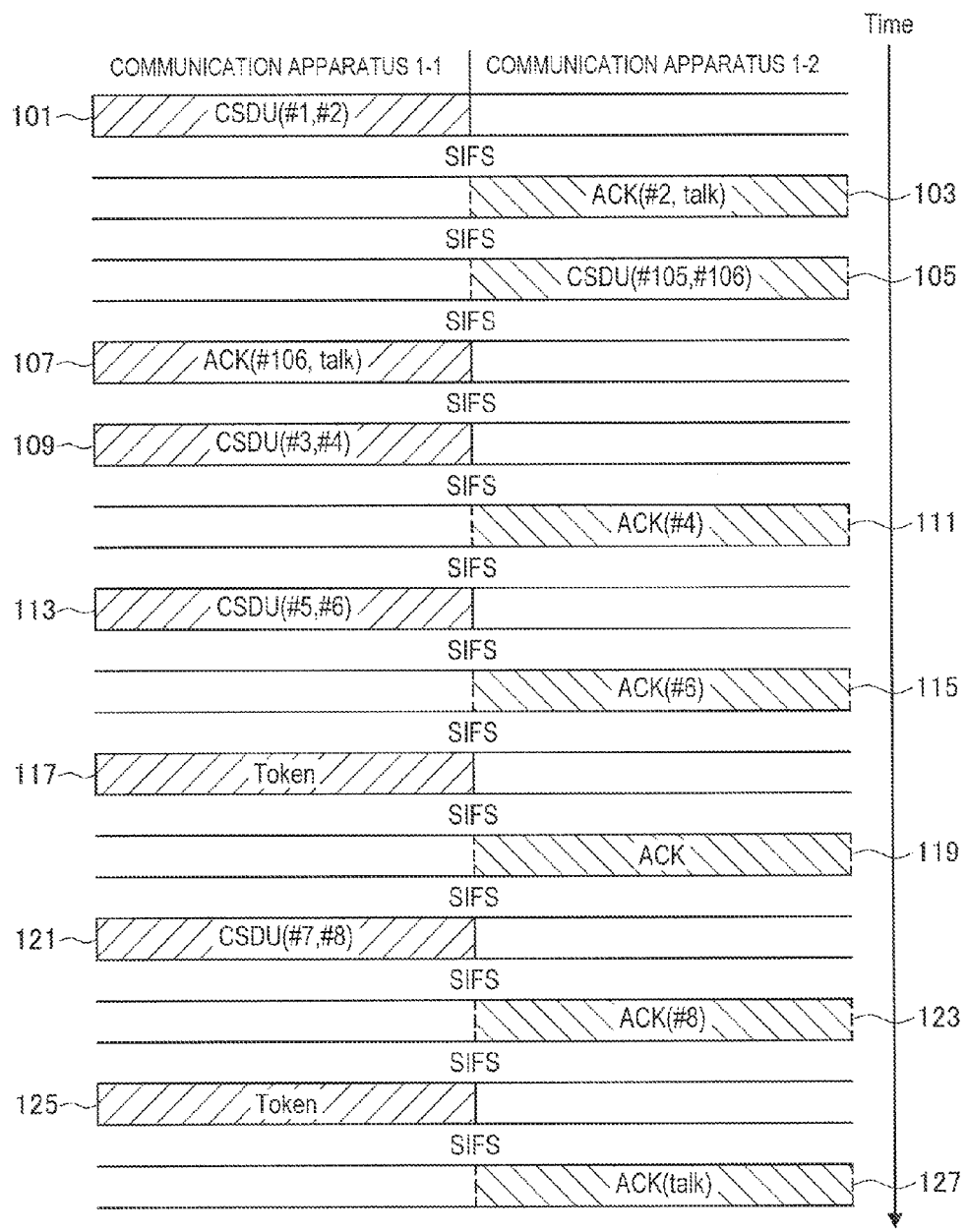
FIG. 9 is a diagram illustrating an example of a transmission right arbitrating operation according to the first embodiment.

FIG. 9 is a diagram illustrating an example of a transmission right arbitrating operation according to the first embodiment. As illustrated in FIG. 9, all of the inter frame spaces after a connection between the communication apparatus 1-1 and the communication apparatus 1-2 is established are SIFS. That is, regardless of whether they are the initiator or the responder, and regardless of whether they are the talker or the listener, the communication apparatuses 1-1 and 1-2 transmit a frame using the same inter frame space.

Here, as described above with reference to FIG. 3 and Table 1, in TransferJet of the comparison scheme, the inter frame space of the responder has an interval that is only Tbst longer than the inter frame space of the initiator. Therefore, when data is transmitted from the responder, a longer time is necessary than when data is transmitted from the initiator. In this regard, in the proposed scheme, as illustrated in FIG. 9, since the inter frame space is uniformly set as SIFS, a transmission time when data is transmitted from the responder is reduced, and it is possible to obtain the same transmission rate as when data is transmitted from the initiator.

The example of the transmission right arbitrating operation has been described above.

[2-3. Sleep for Very Short Time]

The communication system according to the present embodiment sleeps for a very short time while data communication is not performed by the CSDU frame and thus decreases power consumption and implements a high-speed response. Specifically, the talker sets a sleep time in the token frame and notifies the listener of the time. The listener that has received a notification of the sleep time through the token frame performs a sleep operation for the notified time after the ACK frame is transmitted for the token frame. In addition, the talker that has transmitted the token frame in which the sleep time is set performs a sleep operation for the notified time after the ACK frame is received from the listener.

The communication apparatus 1 according to the present embodiment notifies of the sleep time using an LiCC information field in the frame body of the token frame. An exemplary configuration of the frame body in the token frame is shown in the following Table 3.

TABLE 3

| Component name | Value | Description |
| --- | --- | --- |
| LiCC Version | 0x01 | Link Control Command Version |
| LiCC | 0x0B | Token frame (Token) |
| Reserved | 0x00 | Reserved area (Reserved) |
| Reserved | 0x00 | Reserved area (Reserved) |
| Own UID | | Own UID |
| | | [Byte 04, Bit 7]: Own UID [63] |
| | | [Byte 04, Bit 6]: Own UID [62] |
| | | ... |
| | | [Byte 04, Bit 0]: Own UID [56] |
| | | [Byte 05, Bit 7]: Own UID [55] |
| | | ... |
| | | [Byte 11, Bit 0]: Own UID [0] |
| LiCC information | | Byte 12 to 30: reserved. |
| | | Byte 31: sleep period |

As shown in Table 3, in a sleep period of byte 31 of LiCC information, the sleep time is set. A detailed setting example of the sleep period is shown in the following Table 4.

TABLE 4

| Parameter name | Value | Description |
| --- | --- | --- |
| Sleep period | 0 to 255 | Indicate sleep time unit: 10 μsec<br>0: no sleep<br>1: sleep for 10 μsec<br>...<br>255: sleep for 2550 μsec |

The exemplary configuration of the frame body in the token frame has been described above.

When the communication unit 4 sets sleep period information indicating the sleep time shown in Table 4 in the token frame and transmits the frame to the partner device, the communication apparatus 1 pauses communication until the sleep time elapses after the ACK frame for the token frame is received. In addition, when the token frame in which the sleep period shown in Table 4 is set is received, the partner terminal pauses communication for a time indicated by the sleep period after the ACK frame is transmitted. Also, when the ACK frame in which the talk flag is set is transmitted with respect to the token frame in which the sleep time is set, the communication system may cancel the sleep operation.

Here, diverse methods of setting the sleep time and a notification timing of the sleep time by the communication apparatus 1 serving as the talker can be considered. Accordingly, the method of setting the sleep time and the notification timing of the sleep time will be described in detail.

The communication apparatus 1 may set any sleep time. In order to reduce power consumption, it is preferable to set as long a time as possible. When a response time assumed by the application (the application 40 in FIG. 2) of the upper layer is known, the communication apparatus 1 sets a time equal to or less than the response time assumed by the upper layer as the sleep time. This is because, when the sleep operation is performed for the response time assumed by the application of the upper layer or longer, there is a possibility of a time out occurring in the application. On the other hand, when the response time assumed by the application of the upper layer is unknown, the communication apparatus 1 should set the sleep time as a very short time.

In addition, the communication apparatus 1 can notify the partner device of the sleep time at any timing. Here, two notification timings will be described as examples.

The first notification timing is a timing at which the token frame is transmitted a predetermined number of times. Specifically, the communication apparatus 1 transmits the token frame in which the sleep time is set after the token frame is transmitted N times. Accordingly, when data transmission and reception by the application of the upper layer are interrupted for a predetermined time or more, the communication system can perform the sleep operation.

The second notification timing is any timing at which the token frame is transmitted. Specifically, the communication apparatus 1 normally sets the sleep time in the token frame. Accordingly, when data transmission and reception by the application of the upper layer are slightly interrupted, the communication system can perform the sleep operation. Also, in order to perform the sleep operation even when an interruption period of data transmission and reception by the application is unknown, the sleep time should be set as a very short time.

In this manner, while data communication by the CSDU frame is not performed, the communication system according to the present embodiment can implement the sleep operation for a very short time using the token frame and reduce power consumption. Further, when a minimum value of the sleep time in the comparison scheme is 5 milliseconds (msec), it is possible to implement the sleep operation for a range of several μsec (microseconds) as shown in Table 4 in the proposed scheme. Accordingly, the communication system according to the present embodiment can reduce a delay time from when data transmission is requested until sleep is released and data transmission is started, and increase responsiveness.

The method of setting the sleep time and the notification timing of the sleep time by the communication apparatus 1 have been described above. Next, an example of a sleep operation by the communication system according to the present embodiment will be described with reference to FIG. 10.

Figure 10:
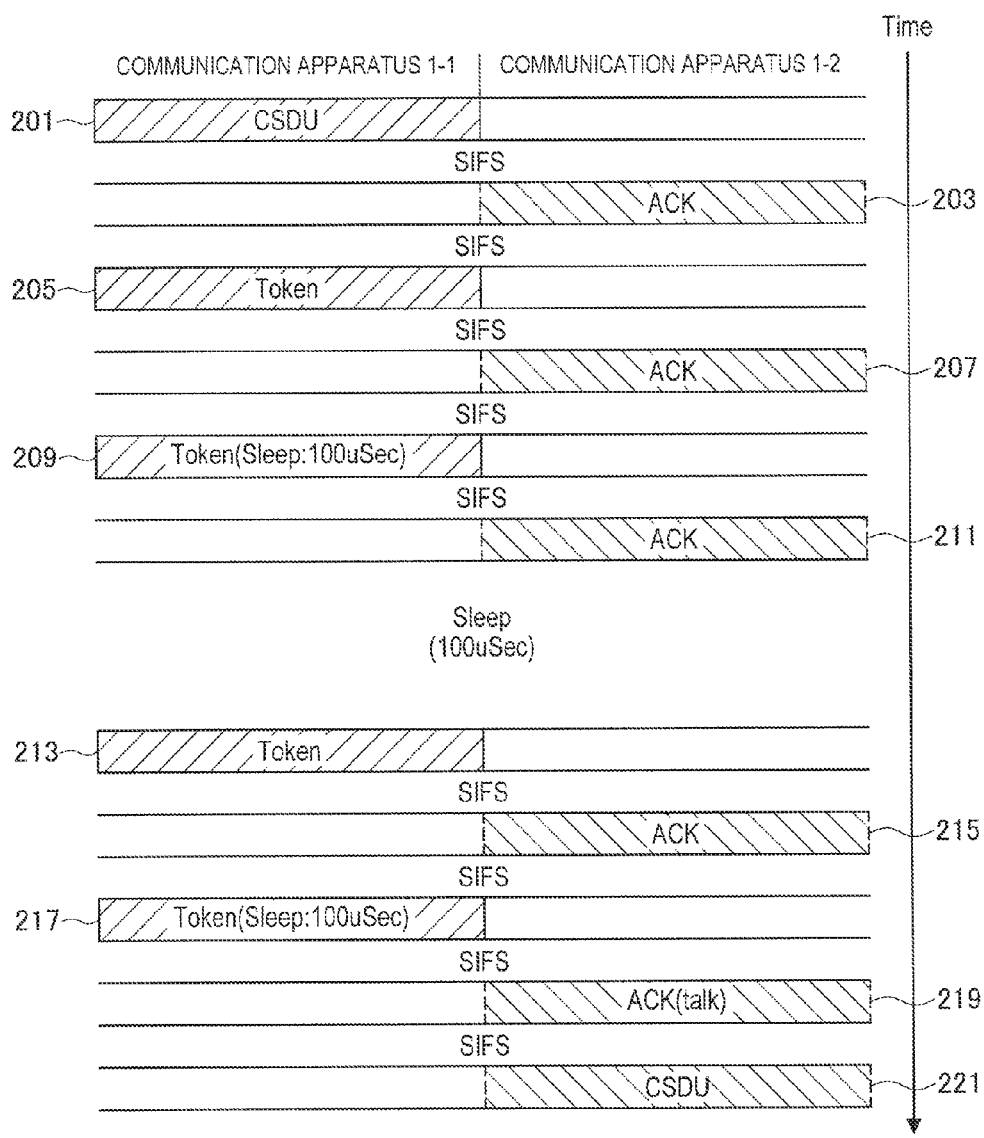
FIG. 10 is a diagram illustrating an example of a sleep operation according to the first embodiment.

FIG. 10 is a diagram illustrating an example of a sleep operation according to the first embodiment. FIG. 10 illustrates an example in which the token frame is transmitted once, the sleep time is then notified of by the second token frame, and the sleep operation for 100 μsec is performed.

As illustrated in FIG. 10, first, the communication apparatus 1-1 serving as the talker transmits a CSDU frame 201 to the communication apparatus 1-2 serving as the listener.

Next, the communication apparatus 1-2 transmits an ACK frame 203 to the communication apparatus 1-1 after the SIFS elapses from when the CSDU frame 201 is received.

Next, the communication apparatus 1-1 transmits a first token frame 205 to the communication apparatus 1-2 after the SIFS elapses from when the ACK frame 203 is received.

Next, the communication apparatus 1-2 transmits an ACK frame 207 to the communication apparatus 1-1 after the SIFS elapses from when the token frame 205 is received.

Then, the communication apparatus 1-1 transmits a second token frame 209 to the communication apparatus 1-2 after the SIFS elapses from when the ACK frame 207 is received. In this case, since the token frame is transmitted a second time, the communication apparatus 1-1 sets 100 μsec as the sleep time in the sleep period of the LiCC information field in the frame body of the token frame.

Next, the communication apparatus 1-2 transmits an ACK frame 211 to the communication apparatus 1-1 after the SIFS elapses from when the token frame 209 is received.

Then, the communication apparatus 1-1 that has received the ACK frame 211 performs the sleep operation for a sleep time of 100 μsec notified of by the token frame 209. In addition, the communication apparatus 1-2 that has transmitted the ACK frame 211 performs the sleep operation for a sleep time of 100 μsec notified of by the token frame 209.

After 100 μsec elapses, the communication apparatus 1-1 is restored from the sleep operation, and transmits a first token frame 213 to the communication apparatus 1-2.

Next, the communication apparatus 1-2 transmits an ACK frame 215 to the communication apparatus 1-1 after the SIFS elapses from when the token frame 213 is received.

Then, the communication apparatus 1-1 transmits a token frame 217 in which a sleep period of 100 μsec is set to the communication apparatus 1-2 as a second token frame after the SIFS elapses from when the ACK frame 215 is received.

Next, the communication apparatus 1-2 transmits an ACK frame 219 in which the talk flag is set to the communication apparatus 1-1 after the SIFS elapses from when the token frame 217 is received. Accordingly, the communication apparatus 1-2 can cancel the sleep operation.

Next, the communication apparatus 1-2 transmits a CSDU frame 221 after the SIFS elapses from when the ACK frame 219 is transmitted.

The exemplary sleep operation by the communication system according to the present embodiment has been described above. Next, operations of the communication apparatus 1 according to the present embodiment will be described with reference to FIG. 11.

[2-4. Operating Process]

Figure 11:
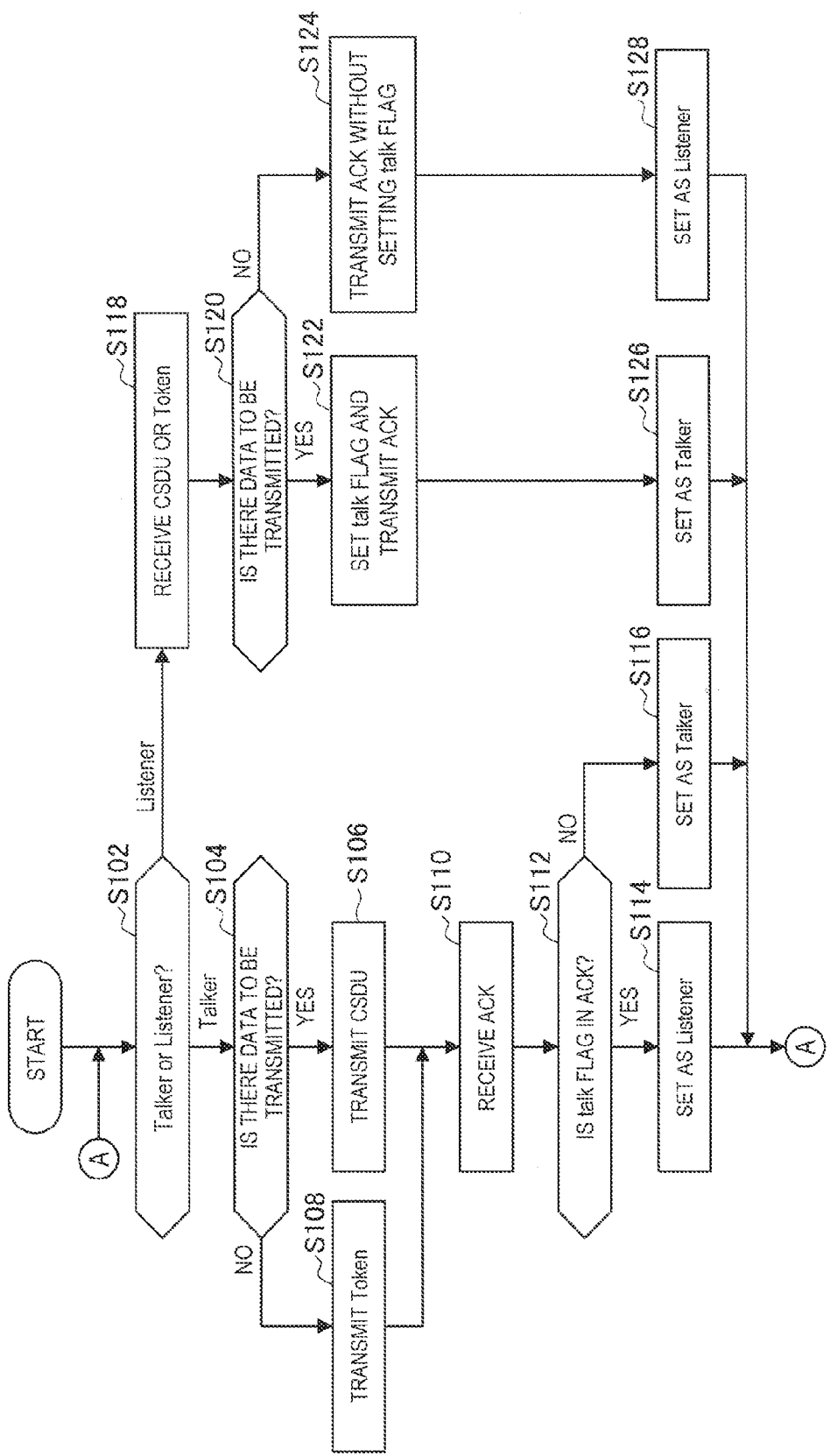
FIG. 11 is a flowchart showing operations of the communication apparatus according to the first embodiment.

FIG. 11 is a flowchart showing operations of the communication apparatus 1 according to the first embodiment. As illustrated in FIG. 11, first, in Step S102, the communication apparatus 1 determines whether its role is that of the talker or the listener. Specifically, the control unit 2 determines the role as that of the talker if the initiator is set when communication starts and determines the role as that of the listener if the responder is set when communication starts. Then, the control unit 2 determines a role with reference to settings in Steps S114, S116, S126, and S128 to be described below.

When it is determined that the communication apparatus 1 has the role of the talker (talker in S102), in Step S104, the communication apparatus 1 determines whether there is data to be transmitted. Specifically, the control unit 2 determines whether there is data to be transmitted based on whether the transmission buffer has data to be transmitted.

When it is determined that there is data to be transmitted (YES in S104), in Step S106, the communication apparatus 1 transmits the CSDU frame. Specifically, the communication unit 4 stores data in the transmission buffer in the CSDU frame and transmits the data to the partner device serving as the listener.

On the other hand, when it is determined that there is no data to be transmitted (NO in S104), in Step S108, the communication apparatus 1 transmits the token frame. Specifically, the communication unit 4 transmits the management frame in which the ACK type of the sub CNL header is set as ImACK and the LiCC of the frame body is set to 0x0B to the partner device as the token frame.

Next, in Step S110, the communication apparatus 1 receives the ACK frame. Specifically, the communication unit 4 receives the ACK frame from the partner device as a response to the CSDU frame transmitted in Step S106 or the token frame transmitted in Step S108.

Next, in Step S112, the communication apparatus 1 determines whether the talk flag is set in the ACK frame. Specifically, the control unit 2 determines whether the talk flag is set in the Reserved field of the ACK frame received in Step S110.

When it is determined that the talk flag is set (YES in S112), in Step S114, the communication apparatus 1 sets its own role as that of the listener. Specifically, the switch unit 3 switches the role of the communication apparatus 1 from that of the talker to that of the listener. Then, the process returns to Step S102 again.

On the other hand, when it is determined that no talk flag is set (NO in S112), in Step S116, the communication apparatus 1 sets its own role as that of the talker. Specifically, the switch unit 3 keeps the role of the communication apparatus 1 as that of the talker. Then, the process returns to Step S102 again.

When it is determined in Step S102 that the communication apparatus 1 has the role of the listener (listener in S102), in Step S118, the communication apparatus 1 receives the CSDU frame or the token frame. Specifically, the communication unit 4 receives the CSDU frame or the token frame from the partner device serving as the talker.

Next, in Step S120, the communication apparatus 1 determines whether there is data to be transmitted.

When it is determined that there is data to be transmitted (YES in S120), in Step S122, the communication apparatus 1 sets the talk flag and transmits the ACK frame. Specifically, the communication unit 4 transmits the ACK frame in which the talk flag is set in the reserved field to the partner device. Then, in Step S126, the communication apparatus 1 sets its own role as that of the talker. Then, the process returns to Step S102 again.

On the other hand, when it is determined that there is no data to be transmitted (NO in S120), in Step S124, the communication apparatus 1 transmits the ACK frame without setting the talk flag. Specifically, the communication unit 4 transmits the ACK frame in which no talk flag is set in the reserved field to the partner device. Then, in Step S128, the communication apparatus 1 sets its own role as that of the listener. Then, the process returns to Step S102 again.

The operations of the communication apparatus 1 according to the present embodiment have been described above.

<3. Summary>

As described above, the communication system according to the present embodiment can support full-duplex communication over a half-duplex communication channel. Specifically, the communication system according to the present embodiment can implement full-duplex communication without decreasing the throughput according to arbitration of the transmission right using the ACK frame in the TransferJet specification. Here, since the communication system according to the present embodiment implements full-duplex communication by control in the CNL layer, arbitration of the transmission right in a layer higher than the CNL layer is unnecessary. Therefore, the communication system according to the present embodiment can increase the throughput with the decrease in a load on the upper layer.

In addition, the communication system according to the present embodiment can reduce power consumption and prevent frame collision without influencing the throughput according to arbitration of the transmission right by the token frame.

Further, the communication system according to the present embodiment can decrease power consumption and implement a high-speed response by the sleep operation for a very short time.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while the communication apparatus 1 performs close proximity wireless communication according to the TransferJet specification in the above embodiment, the present technology is not limited thereto. For example, the communication apparatus 1 may communicate with the external device through Bluetooth (registered trademark), Zigbee (registered trademark) or Ultra Wide Band (UWB).

In addition, a computer program for implementing the same functions as respective configurations of an information processing device is also created in hardware such as a CPU, a ROM and a RAM to be installed in the information processing device. In addition, a recording medium in which the computer program is recorded is provided.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)
A communication apparatus including:
a switch unit configured to switch data communication to be performed with another communication apparatus on a transmission side or a reception side; and
a communication unit configured to transmit transmission data to the other communication apparatus and receive a response when the data communication is performed on the transmission side, and receive reception data from the other communication apparatus and transmit a response when the data communication is performed on the reception side,
wherein the switch unit performs switching from the transmission side to the reception side when the response received by the communication unit includes a switching instruction.

(2)
The communication apparatus according to (1),
wherein the communication unit communicates with the other communication apparatus through close proximity wireless communication.

(3)
The communication apparatus according to (1) or (2),
wherein the communication unit transmits a transmission right arbitration frame in place of the transmission data to the other communication apparatus and receives the response.

(4)
The communication apparatus according to (3),
wherein the communication unit transmits the transmission right arbitration frame to the other communication apparatus when the communication apparatus is on the transmission side and there is no data to be transmitted.

(5)
The communication apparatus according to any one of (1) to (4),
wherein the communication unit transmits the response including the switching instruction to the other communication apparatus.

(6)
The communication apparatus according to (5),
wherein the switch unit performs switching from the reception side to the transmission side when the communication apparatus is on the reception side and there is data to be transmitted, and
wherein the communication unit transmits the transmission data to the other communication apparatus after the response including the switching instruction is transmitted.

(7)
The communication apparatus according to (3) or any one of (4) to (6) dependent from (3),
wherein the communication unit sets information indicating a sleep time in the transmission right arbitration frame, transmits the frame to the other communication apparatus, and pauses communication until the sleep time elapses after the response is received.

(8)
The communication apparatus according to any one of (1) to (7),
wherein the communication apparatus is either a responder or an initiator, and
wherein the communication unit transmits the transmission data using a same inter frame space regardless of whether the communication apparatus is the responder or the initiator.

(9)
A communication system including:
a first communication apparatus configured to perform data communication on a transmission side and a second communication apparatus configured to perform data communication on a reception side,
wherein the first communication apparatus includes
a first switch unit configured to perform switching from the transmission side to the reception side, and
a first communication unit configured to transmit transmission data to the second communication apparatus and receive a response,
wherein the second communication apparatus includes
a second switch unit configured to perform switching from the reception side to the transmission side, and
a second communication unit configured to receive the transmission data from the first communication apparatus and transmit the response, and
wherein the second switch unit performs switching from the reception side to the transmission side when the response including a switching instruction is transmitted by the second communication unit, and the first switch unit performs switching from the transmission side to the reception side when the response is received by the first communication unit.

(10)
A communication method including:
switching data communication to be performed with another communication apparatus on a transmission side or a reception side:
transmitting transmission data to the other communication apparatus and receiving a response when the data communication is performed on the transmission side and receiving reception data from the other communication apparatus and transmitting a response when the data communication is performed on the reception side; and
performing switching from the transmission side to the reception side when the received response includes a switching instruction.

REFERENCE SIGNS LIST 1, 1-1, 1-2 communication apparatus
2 control unit
3 switch unit
4 communication unit
5-1, 5-2 role
6-1, 6-2 transmission buffer
10 PHY layer
20 CNL layer
30 PCL layer
40 application

The invention claimed is:
1. A first communication apparatus, comprising:
a switch unit configured to switch data communication of the first communication apparatus with a second communication apparatus,
wherein the first communication apparatus is switched to one of a transmission side or a reception side, based on the data communication; and a communication interface configured to:

transmit transmission data to the second communication apparatus and receive a response, based on the data communication that is on the transmission side; and receive reception data from the second communication apparatus and transmit a response, based on the data communication that is on the reception side, wherein the first communication apparatus is switched from the transmission side to the reception side based on a switching instruction that is included in the response received by the communication interface, wherein the first communication apparatus is one of a responder or an initiator, and wherein the transmission data is transmitted with same inter frame space regardless of the first communication apparatus being the responder or the initiator.

2. The first communication apparatus according to claim 1,
wherein the communication interface is further configured to communicate with the second communication apparatus via close proximity wireless communication.

3. The first communication apparatus according to claim 1,
wherein the communication interface is further configured to transmit, in place of the transmission data, a transmission right arbitration frame to the second communication apparatus and receive the response.

4. The first communication apparatus according to claim 3,
wherein the communication interface is further configured to transmit the transmission right arbitration frame to the second communication apparatus based on the first communication apparatus that is switched to the transmission side and based on an unavailability of the transmission data.

5. The first communication apparatus according to claim 1,
wherein the communication interface is further configured to transmit the response to the second communication apparatus, and wherein the transmitted response includes the switching instruction.

6. The first communication apparatus according to claim 5,
wherein the switch unit is further configured to switch the first communication apparatus from the reception side to the transmission side based on an availability of the transmission data, and
wherein the communication interface is further configured to transmit the transmission data to the second communication apparatus based on transmission of the response including the switching instruction.

7. The first communication apparatus according to claim 3,
wherein the communication interface is further configured to:
set information in the transmission right arbitration frame, wherein the information comprises a sleep time;
and
pause the data communication based on an elapse of the sleep time after the response is received.

8. A communication system, comprising:
a first communication apparatus configured to transmit transmission data from a transmission side; and
a second communication apparatus configured to receive the transmission data on a reception side,
wherein the first communication apparatus is an initiator and the second communication apparatus is a responder,
wherein the first communication apparatus includes:
a first switch unit configured to switch the first communication apparatus from the transmission side to the reception side, and
a first communication interface configured to transmit the transmission data to the second communication apparatus and receive a response,
wherein the second communication apparatus includes:
a second switch unit configured to switch the second communication apparatus from the reception side to the transmission side, and
a second communication interface configured to receive the transmission data from the first communication apparatus and transmit the response,
wherein the second communication apparatus is switched from the reception side to the transmission side based on transmission of the response that includes a switching instruction by the second communication interface, and
wherein the first communication apparatus is switched from the transmission side to the reception side based on the reception of the response by the first communication interface, and
wherein each of the first communication apparatus and the second communication apparatus is configured to transmit the transmission data with a same inter frame space.

9. A communication method, comprising:
in a first communication apparatus:
switching data communication of the first communication apparatus with a second communication apparatus,
wherein the first communication apparatus is switched to one of a transmission side or a reception side, based on the data communication;
transmitting transmission data to the second communication apparatus and receiving a response based on the data communication that is on the transmission side; and
receiving reception data from the second communication apparatus and transmitting a response based on the data communication that is on the reception side,
wherein the first communication apparatus is switched from the transmission side to the reception side based on a switching instruction that is included in the received response, and
wherein the first communication apparatus is one of a responder or an initiator, and
wherein the transmission data is transmitted using a same inter frame space regardless of the first communication apparatus being the responder or the initiator.

* * * * *